United States Patent [19]

Koch et al.

[11] Patent Number: 4,564,277

[45] Date of Patent: Jan. 14, 1986

[54] APPARATUS FOR A PHOTOGRAPHIC CAMERA WITH LENS AND FILM CARRIERS WHICH CAN BE RESET IN RELATION TO ONE ANOTHER

[75] Inventors: Hans-Carl Koch, Flurlingen; Carl Koch, Stetten; Karl Gfeller, Langwiesen, all of Switzerland

[73] Assignee: Sinar AG Schaffhausen, Feuerthalan, Switzerland

[21] Appl. No.: 657,945

[22] Filed: Oct. 5, 1984

[30] Foreign Application Priority Data

Oct. 13, 1983 [CH] Switzerland ............. 5591/83

[51] Int. Cl.⁴ ............................................. G03B 27/68
[52] U.S. Cl. ................... 354/160; 354/189; 354/412
[58] Field of Search ............ 354/412, 99, 160, 189

[56] References Cited

U.S. PATENT DOCUMENTS

| | | | |
|---|---|---|---|
| 3,479,945 | 11/1969 | Koch | 354/189 |
| 3,587,432 | 6/1971 | Koch | 354/189 |
| 3,825,938 | 7/1974 | Koch | 354/189 |

*Primary Examiner*—Russell E. Adams

*Attorney, Agent, or Firm*—Watson, Cole, Grindle & Watson

[57] ABSTRACT

An apparatus permits, with the aid of an electronic calculator, the calculation of the spatial coordinates of object points of a motif scene to be photographed, and does so based upon the image points optically image inverted for the object points. The calculator is programmed so that, in accordance with Scheimpflug's Law, it generates output signals which correspond to an ideal setting of the film carrier and/or the lens carrier of the camera. By means of electro-optical and/or acoustical signal emitters, the ideal setting of the image and/or lens carriers, or the resetting required for the introduction of the ideal setting, are indicated to the photographer. For this purpose, the mechanical reset mechanisms for the film carrier and the lens carrier are connected to the actual-position signal emitters, which transmit actual-position signals to the calculator. The mechanical reset mechanisms can also be coupled to drive motors, which are controllable by the output signals of the calculator, and in each case automatically introduce the ideal-setting of the film and/or lens carrier ascertained by the calculator.

26 Claims, 6 Drawing Figures

APPARATUS FOR A PHOTOGRAPHIC CAMERA WITH LENS AND FILM CARRIERS WHICH CAN BE RESET IN RELATION TO ONE ANOTHER

BACKGROUND OF THE INVENTION

The present invention relates to an apparatus provided for a photographic camera with lens and film carriers which can be reset in relation to one another for the computational ascertainment of data concerning the settings of the lens and film carriers in regard to a facilitated attainment of optimal camera settings related to a motif scene to be photographed.

As known, the image perspective and the sharpness/non-sharpness process of the image can be influenced by resetting the lens and film carriers in relation to one another and in relation to the motif scene to be photographed, whereby the perspective and the sharpness or non-sharpness of the image can be both corrected and purposefully accentuated, within optically determined limits. Thus the photographer has image-creative means at his disposal which are not, or only to a limited degree, provided by a so-called fixed camera. In practical terms, the resetting of the lens and film carriers signifies changing the distance between the lens and film carriers, the movement of at least one of the carriers in its own plane, and/or the pivoting of at least one of the carriers.

As further known, the image sharpness is influenced by the spatial orientation of three planes, namely the object plane, the image plane and the lens plane. A sharp image is obtained if these three planes are parallel to each other, or otherwise—according to Scheimpflug's law—intersect in common alignment. Many photographers often have trouble introducing or maintaining the latter condition, if as an additional measure, an additional resetting, for example for the purpose of changing the frame or the image standard, is required. In some camera designs, if the pivot axis of the film carrier and/or the lens carrier is not in the image plane or lens plane, respectively, or is outside of the frame provided by the image carrier, this makes it all the more difficult. In some cases, therefore, setting the camera becomes an exercise of pure trial-and-error, which is not only a waste of time but also often results in non-optimal camera settings, in terms of the image.

SUMMARY OF THE INVENTION

It is therefore an object of the present invention to provide an apparatus of the aforedescribed type which to a significant degree facilitates the exact observance of Scheimpflug's law, by—based on the given settings of the lens and film carriers of the camera—permitting the ascertainment, according to direction and size, of the ideal setting of the film carrier and/or the lens carrier, or the resetting of the film carrier and/or the lens carrier necessary for the introduction of the ideal setting that is best suited for photographing a given motif scene, regardless of the mechanical design and construction of the reset mechanisms for the lens carrier and/or the film carrier.

Another object of the invention is to provide such an apparatus that, when ascertaining the optimal setting of the image carrier and/or the lens carrier, it also takes into account the image-side depth of focus obtained by screening off the camera lens.

A further object is to provide such an apparatus that the resettings necessary for the introduction of the optimal ideal setting of the film carrier and/or the lens carrier is carried out with the use of a motor, and largely automatically.

Specifically, the apparatus according to the invention permits, in each case and for a given setting of the lens, the generation of electrical spatial coordinate signals of the image points which have been optically image inverted for each point of measurement of the motif scene, and the entering of such signals into an electronic calculator which transmits to signal evaluation devices electrical output signals based on the spatial coordinate signals input, and based on Scheimpflug's law, whereby the output signals are ideal position signals corresponding to an ideal setting of the film carrier and/or the lens carrier for minimal nonsharpness of the image of the measurement points, and/or are position-modification signals corresponding to the resetting necessary for the introduction of the ideal setting of the film carrier and/or the lens carrier. The signal evaluation devices can be designed such that, in controlled dependence upon the output signals of the calculator, they indicate optically and/or accoustically the requisite ideal setting or the resetting to be accomplished, of the film carrier and/or the lens carrier, so that the photographer can manually introduce the ideal setting. In place of, or in addition thereto, the signal evaluation devices can be such that they direct the drive motors provided for the reset mechanisms of the lens and film carriers, so that the ideal setting ascertained by the calculator is in each case introduced automatically.

The apparatus can be integrated into a photographic camera of the aforedescribed type, or can be attached to such camera.

With the apparatus according to the invention, an aid is made available to the photographer so that obtaining optimal camera settings does not depend only on the experience and skill of the photographer, as before. The invention permits the introduction of correct camera settings according to Scheimflug's Law relatively rapidly and securely, with no unnecessary detours or experiments.

Additional advantages and details of the invention will become apparent from the patent claims, the following description of examples of the invention, and the attached drawings, which are designed principally as examples for an understanding of the invention.

DETAILED DESCRIPTION OF THE INVENTION

Figure 1:
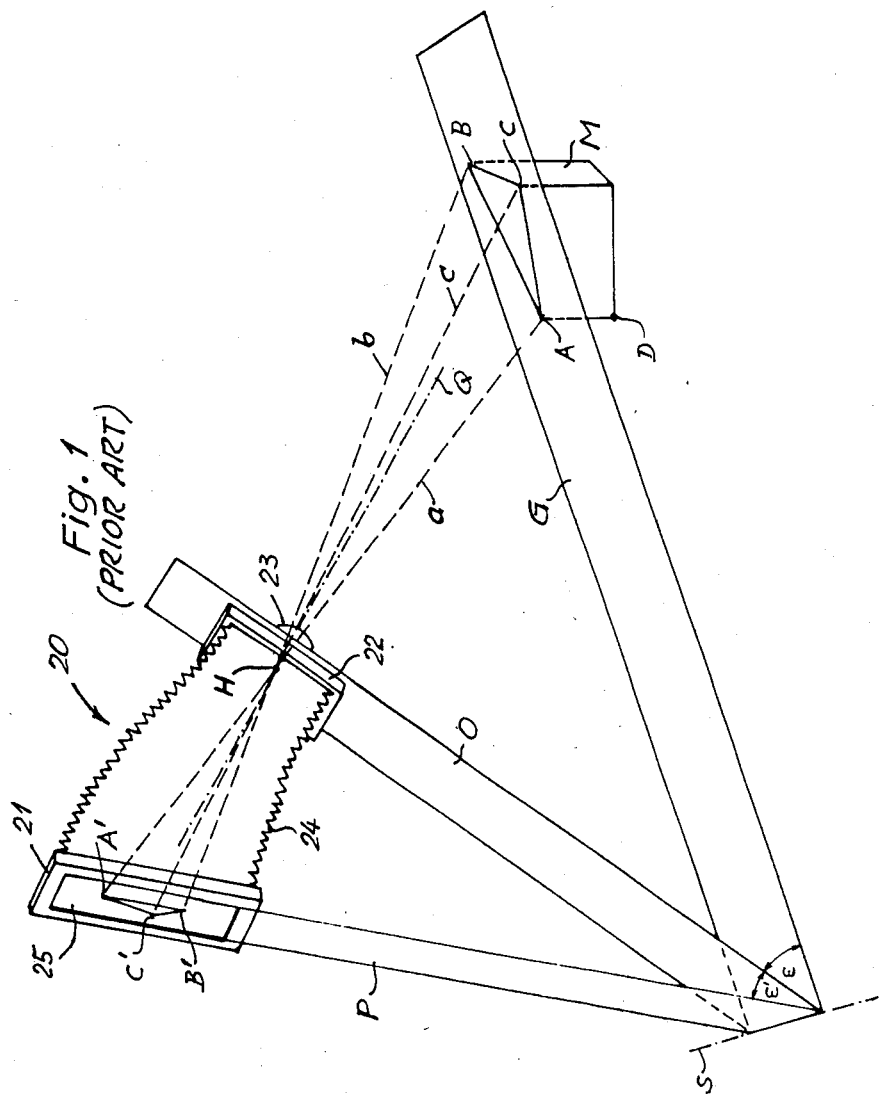
FIG. 1 is a perspective view of parts of a photographic focusing screen camera set in relation to a motif scene according to Scheimpflug's law.

Scheimpflug's law, which is important in photographic technology, is illustrated schematically in FIG. 1. A photographic camera is generally designated 20, and has a resettable film carrier 21, a lens carrier, 22, which is also resettable, a lens 23, and a light-tight bellows 24, which connects the film carrier 21 with the lens carrier 22. A focusing screen 25 is mounted on the film carrier 21 for image control before photographic exposure. With camera 20, an object M is to be photographed such that three points A, B and C of the object M are sharply reproduced on the photographic image. In order to achieve this it is necessary, according to Scheimpflug, to arrange the film carrier 21 and the lens carrier 22 of the camera in relation to the object M to be photographed such that the image plane P, the main plane O of the camera lens 23, and the plane G defined by the three object points A, B, and C intersect in a common alignment s, as can be clearly seen in FIG. 1. If this condition is fulfilled, the points A', B', and C', which have been optically conjugated or image inverted for the object points A, B, and C, will be exactly in the image plane P. Thus, all three object points will be sharply reproduced. Points located in front of or beyond plane G, such as, for example, point D of object M, can only be reproduced approximately sharply simultaneously with the points A, B, and C by increasing the depth of focus of the lens 23 by screening. For the sake of simplicity, the plane G defined by the object points A, B, and C is defined as the scene plane, and the main plane O of the lens 23 is designated the lens plane. The scene plane G and the lens plane O are inclined in relation to each other at an angle $\epsilon$, while an angle $\epsilon'$ represents the inclination of the image plane P in relation to the lens plane O. The light rays a, b, and c, which extend from the object points A, B, and C to the corresponding image points A', B', and C', intersect at a point H, the main point of the lens 23, which is in the lens plane O and on the optical axis Q of the lens 23.

The setting of the camera 20 according to Scheimpflug's Law often causes difficulties for the photographer, because the planes G, O and P, illustrated in FIG. 1, and the intersection alignments are not easily recognizable to the photographer. The present invention permits the achievement of correct settings of the film carrier 21 and the lens carrier 22 effortlessly by calculative means. Before describing the means and apparatus suitable for carrying out the invention, the procedure for achieving this goal will be explained purely by way of example. For the sake of simplicity, and of a more comprehensible representation, the camera is described simply by the image plane P, the lens plane O and the main plane of the lens 23. In addition, the optical axis Q of the lens is included.

The image plane P and the lens plane O are first of all set parallel to each other, and the camera is arranged in relation to the image points A, B, and C, which are to be sharply reproduced such that at first only non-sharp reproductions of the object points are visible on the focusing screen mounted on the film carrier of the camera. Then the image plane P is set to the image point A', which has been optically image inverted for the object point A, by means of a parallel movement of the film carrier such that point A is sharply reproduced on the focusing screen. This situation of the image plane will be designated $P_A$. Then the spatial coordinates of image point A' are ascertained according to a certain, but basically arbitrarily selectable, coordinate system. For example, a right-angle coordinate system may be designated with x, y, and z axes. Thereafter, the image P is set to the image point B', which has been optically image inverted for the object point B, by means of parallel movement of the film carrier, such that point B is sharply reproduced on the focusing screen. The resulting situation of the image plane will be designated as $P_B$. Then the spatial coordinates of image point B' are ascertained in the same coordinate system. In regard to image point C', which has been optically image inverted for object point C, a procedure in an analogous manner is undertaken, which results in the situation of the image plane designated as $P_C$.

The spatial coordinates of the main point H and the equation of the optical axis Q which passes through the main point H are ascertained according to the same coordinate system.

Based on the spatial coordinates of image points A', B', and C' ascertained, as well as the spatial coordinates of the main point H, the equation of the optical axis Q and the focal distance f of the lens, the spatial coordinates of each of the object points A, B, and C, respectively, can be calculated according to the known rules of geometrical optics and analytical geometry, and the equation of scene plane G defined by the object points can be ascertained. Scene plane G is independent of the camera 20. After the scene plane G has been computationally ascertained in the above-described manner, the settings of the lens plane O and/or the image plane P of the camera 20 can basically be modified as desired. The further process for the introduction of a camera setting according to Scheimpflug can differ.

Based on a given setting of the lens carrier 22, the following process, for example, could be pursued: The spatial coordinates of the main point H of the lens 23 and the equation of the optical axis Q, which passes vertically through the lens plane in the main point H, permit the ascertainment of the equation defining the lens plane. Based on the equation of the scene plane G and the lens plane O, the equation for the definition of the intersection alignments of the two planes G and O can be ascertained. The film carrier 21 of the camera then has to be set such that the intersection alignment s and one of the image points A', B', and C' which have been optically image inverted for the object points A, B, and C, come to be situated in the image plane P. Then the image points A', B', and C' appear as sharp reproductions of the corresponding object points A, B, and C.

Based, however, on a given setting of the film carrier 21 which setting, for instance, has been selected in regard to a desired perspective of the reproduction on the focusing screen 25, the equation for the image plane P will be ascertained first, followed by the equation for the intersection line s of such plane, derived from the equations for the scene plane G and the image plane P. The lens carrier 22 of the camera should then be set such that the intersection alignment s comes to be situated in the lens plane, and the main point H of the lens 23 occupies a position such that one of the image points A', B', and C' which have been image inverted for the object points A, B, and C, comes to be situated in the image plane P. Then the image points A', B' and C' will appear on the focusing screen plane 25 of the film carrier 21 as sharp reproduction of the corresponding object points A, B, and C.

For the practical execution of the described calculations and actions it is useful to select a spatial coordinate system that has a fixed relationship to a part of the camera. The calculations are particularly easy when the coordinate system originates in the main point H of the camera lens, and produces a coordinate axis that coincides with the optical axis Q of the lens. This may involve a coordinate system with cylinder coordinates or one with right-angle coordinates (not shown).

Thus, a right-angled coordinate system has a y-axis which coincides with the optical axis Q of the camera lens, and x and z axes which lie in the lens plane O, whereby the z-axis lies in the plane of the drawing, and the x-axis extends perpendicularly to it and is therefore not visible. The projections of object points A, B, and C performed in the directions of the x-axis are designated $A_x$, $B_x$ and $C_x$. $A_x'$, $B_x'$, and $C_x'$ are the analogous projections of the image points optically image inverted for the image points A, B, and C. The y and z coordinates may also be set forth for the points A and A'. In addition, the focal points F and F', as well as the focal distance f of the lens are to be considered.

According to the rules of geometrical optics, the following applies:

$$z_a'/y_a' = tg\delta = z_a/y_a \tag{1}$$

$$-z_a'/f = tg\theta = z_a/(y_a - f) \tag{2}$$

$$y_a = f y_a'/(y_a' + f) \tag{3}$$

$$z_a = f z_a'/(y_a' + f) \tag{4}$$

By means of an analogous projection of the image points A, B, and C, as well as of the associated image points A', B' and C' on the plane of the x and y axes, the following additional equation can be deduced.

$$x_a = f x_a'/(y_a' + f) \tag{5}$$

The equations (3), (4) and (5) permit the calculation of the x, y and z coordinates of the image point A. In a completely analogous manner, the spatial coordinates of the image points B and C can also be calculated from the spatial coordinates of the corresponding image points B' and C'.

Figure 3:
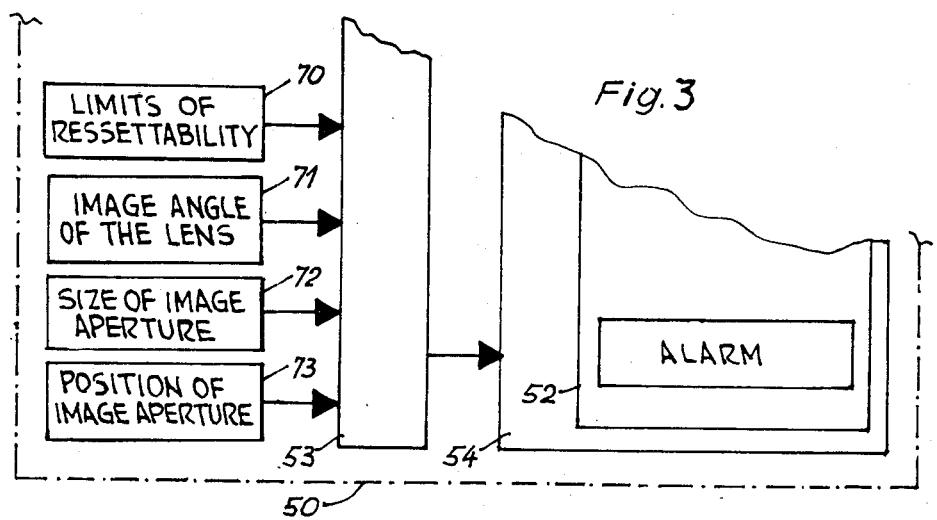
FIG. 3 is a schematic representation of a part of another version of the calculator shown in FIG. 2.

From the y coordinates of the image points A', B', and C', the arithmetic means value $P_o$, which is hereinafter designated as the mean image distance, can be formed. The means value of the y coordinates of the object points A, B, and C is hereinafter the mean object distance $g_o$. In FIG. 3, the distances $P_o$ and $g_o$ are drawn in. According to the rules of geometrical optics, the mean image scale $m_o$ is:

$$m_o = p_o/g_o \tag{6}$$

In addition, the following equations apply:

$$p_o = f(1 + m_o) \tag{7}$$

$$g_o = f(1 + m_o)/m_o \tag{8}$$

Based on the coordinates x, y, and a z calculated for (3), (4) and (5) for each of the three object points A, B, and C the scene plane passing through these points g is determined, which can be represented by the following 3d-degree determinants:

$$\begin{vmatrix} x - x_a & y - y_a & z - z_a \\ x_b - x_a & y_b - y_a & z_b - z_a \\ x_c - x_a & y_c - y_a & z_c - z_a \end{vmatrix} = 0 \tag{9}$$

By expansion of the determinants (9) the following equation is obtained for the plane G:

$$(x - x_a)(y_b - y_a)(z_c - z_a) + (y - y_a)(z_b - z_a)(x_c - x_a) + \\ (z - z_a)(x_b - x_a)(y_c - y_a) - (z - z_a)(y_b - y_a)(x_c - x_a) - \\ (x - x_a)(z_b - z_a)(y_c - y_a) - (y - y_a)(x_b - x_a)(z_c - z_a) = 0 \tag{10}$$

In general linear form, the equation of plane G is:

$$K_1 x + K_2 y + K_3 z + T = 0 \tag{11}$$

From the equation (10), the values for the coefficients $K_1$, $K_2$, $K_3$, and T in equation (11) can be calculated:

$$K_1 = (y_b - y_a)(z_c - z_a) - (z_b - z_a)(y_c - y_a) \tag{12}$$

$$K_2 = (z_b - z_a)(x_c - x_a) - (x_b - x_a)(z_c - z_a) \tag{13}$$

$$K_3 = (x_b - x_a)(y_c - y_a) - (y_b - y_a)(x_c - x_a) \tag{14}$$

$$T = -k_1 x_a - K_2 y_a - K_3 z_a \tag{15}$$

The scene plane G intersects the x-axis, the y-axis and the z-axis at points which lie at distances of u, v, and w, respectively, from the origin of the coordinate system, according to the following equations:

$$u = -T/K_1 (= X-\text{axis segment}) \tag{16}$$

$$v = -T/K_2 (= y-\text{axis segment}) \tag{17}$$

$$w = -T/K_3 (= z-\text{axis segment}) \tag{18}$$

In relation to the coordinate system described in FIG. 3, the equation for the lens plane O is:

$$y = 0 \tag{19}$$

The intersection lines s of the lens plane O and the scene plane G is defined by the equation:

$$z = -\frac{K_1}{K_3} x - w \tag{20}$$

For the angle between the lens plane O and the scene plane G, the following equation applies:

$$\cos \epsilon = \frac{K_2}{\sqrt{K_1^2 + K_2^2 + K_3^2}} \tag{21}$$

Based on the coordinates x', y', and z' for each of the image points A', B', and C', which have been image inverted for the object points A, B, and C, the image plane P, which passes through the latter points is determined; its equation is:

$$K'_1 x + K'_2 y + K'_3 z + T' = 0 \tag{22}$$

where, analogously to the equations (12) through (18), the following applies:

$$K'_1 = (y'_b - y'_a)(z'_c - z'_a) - (z'_b - z'_a)(y'_c - y'_a) \tag{23}$$

$$K'_2 = (z'_b - z'_a)(x'_c - x'_a) - (x'_b - x'_a)(z'_c - z'_a) \tag{24}$$

$$K'_3 = (x'_b - x'_a)(y'_c - y'_a) - (y'_b - y'_a)(x'_c - x'_a) \tag{25}$$

$$T = K'_1 x_a - K'_2 y'_a - K'_3 z'_a \tag{26}$$

$$u' = -T/K'_1 (= x-\text{axis segment}) \tag{27}$$

$$v' = -T/K'_2 \, (=y\text{-axis segment}) \tag{28}$$

$$w' = -T/K'_3 \, (=z\text{-axis segment}) \tag{29}$$

The common intersection line s of the lens plane O with the image plane P is defined by the equation:

$$z = -\frac{K'_1}{K'_3} x - w' \tag{30}$$

For the angle $\epsilon'$ between the lens plane O and the image plane P, the following equation applies:

$$\cos \epsilon' = \frac{K'_2}{\sqrt{K'_1{}^2 + K'_2{}^2 + K'_3{}^2}} \tag{31}$$

If the camera is correctly set according to Scheimpflug's Law, the scene plane G, the lens plane O and the image plane G have as has been pointed out, a common intersection alignment s. Consequently, both the equation (20) and the equation (30) apply for this intersection alignment:

$$z = -\frac{K'_1}{K'_3} x - w' = -\frac{K_1}{K_3} x - w \tag{32}$$

Since, in addition, the z-axis segments w and w' are identical it follows from equation (32) and from the equation (18) and (29) that:

$$K'_1/K_1 = K'_3/K_3 = T'/T \tag{33}$$

An alignment running from the origin of the coordinate system, in this case from the main point H, which meets the image plane P perpendicularly, forms, with the x, y, and z coordinate axes, the angles $\alpha$, $\beta$ and $\gamma$, for which the following equations apply:

$$\cos \alpha = \frac{K'_1}{\sqrt{K'_1{}^2 + K'_2{}^2 + K'_3{}^2}} \tag{34}$$

$$\cos \beta = \frac{K'_2}{\sqrt{K'_1{}^2 + K'_2{}^2 + K'_3{}^2}} \tag{35}$$

$$\cos \gamma = \frac{K'_3}{\sqrt{K'_1{}^2 + K'_2{}^2 + K'_3{}^2}} \tag{36}$$

The equations (34) through (36) permit the calculation of the angles at which the image plane P in relation to the lens plane O must pivot and or incline. Once the correct pivot and/or inclination position of the image plane P has been obtained, the photographer must only modify the distance of the film carrier from the lens carrier of the camera such that the image points A', B' and C' appear sharply on the focusing screen.

From the angles $\epsilon$ and $\epsilon'$ respectively between the three planes G, O and P, the means image scale $m_o$ can be calculated exactly according to the following equation:

$$m_o = tg\epsilon'/tg\epsilon \tag{37}$$

The equation (37) can be transformed into the following form:

$$m_o = \frac{\cos \epsilon}{\cos \epsilon'} \sqrt{\frac{1 - \cos^2 \epsilon'}{1 - \cos^2 \epsilon}} \tag{38}$$

By using the equations (1) and (31) in the equation (38), and after transformation, the following equation is also derived for the mean image scale $m_o$:

$$m_o = \frac{K_2}{K'_2} \sqrt{\frac{K'_1{}^2 + K'_3{}^2}{K_1{}^2 + K_3{}^2}} \tag{39}$$

The skilled artisan knows that with the described pivoting and/or inclination of the film carrier for the introduction of a camera setting according to Scheimpflug, the perspective in the image of the object to be photographed changes. It is equally well-known to the photographer that he can retain a desired perspective by resetting the lens carrier instead of the film carrier of the camera, until Scheimpflug's Law is fulfilled, whereby, however, in the latter case a change of the mean image scale $m_o$ generally occurs, and the points A', B', and C', which have been optically image inverted for the object points A, B and C, change their spatial position.

After the spatial coordinates of image points A', B' and C' have been ascertained, and the spatial coordinates of the object points A, B, and C have been calculated from them, the scene plane G is basically known. It is defined by the equation (11). If the photographer does not desire to set the image plane P at the plane passing through the image points A', B' and C', which have been optically image inverted for the object points A, B, and C, but sets it at a different position in view of a desired perspective of the image, then this image plane P* is generally defined by the equation:

$$K''_1 x + K''_2 y + K''_3 z + T' = 0 \tag{40}$$

For every plane containing the common intersection alignment s of the scene plane G and the image plane P*, the following equation applies:

$$(K_1 x + K_2 y + K_3 z + T) + n(K''_1 x + K''_2 y + K''_3 z + T') = 0 \tag{41}$$

in which n is an arbitrary number.

If, for the sake of simplicity, it is assumed that the image plane P* is left by the photographer in a position parallel to the xz plane—as for the ascertainment of the spatial coordinates of the object points A, B, and C—then the following applies for the image plane P*:

$$K''_1 = K''_3 = 0 \tag{42}$$

$$K''_2 y + T' = 0 \tag{43}$$

$$y = v'' \tag{44}$$

where $v''$ is the distance of the image plane P* from the origin of the coordinate system.

The lens plane O*, which passes through the common intersection alignment s of the scene plane G and the image plane P* is then defined by the following equation:

$$K_1 x + (K_2 + nK''_2) y + K_3 z + T + n \, T' = 0 \tag{45}$$

or, by incorporating the equations (43) and (44):

$$K_1 x + \left(K_2 - n\frac{T''}{v''}\right) y + K_3 z + T + n T' = 0 \tag{46}$$

The angle $\epsilon'$ between the image plane P* and the lens plane O* is:

$$\cos \epsilon' = \frac{K_2 - n\frac{T''}{v''}}{\sqrt{K_1^2 + \left(K_2 - n\frac{T''}{v''}\right)^2 + K_3^2}} \tag{47}$$

In this case, the following applies for the mean image scale $m_o$:

$$m_o = \frac{K_2}{K''_2} = -\frac{K_2 v''}{T'} \tag{48}$$

If the lens plane O* passes through the origin of the coordinate system, then $n = -T/T''$, and the equations (46) and (47) for the lens plane O* and/or the angle $\epsilon'$ are reduced to:

$$K_1 x + \left(K_2 + \frac{T}{v''}\right) y + K_3 z = 0 \tag{49}$$

$$\cos \epsilon' = \frac{K_2 + \frac{T}{v''}}{\sqrt{K_1^2 + \left(K_2 + \frac{T}{v''}\right)^2 + K_3^2}} \tag{50}$$

A line which passes through the origin of the coordinate system, and is perpendicular to the lens plane O*, forms, with the x, y, and z coordinate axes, the angles $\alpha^*$, $\beta^*$ and $\gamma^*$, for which the following equations apply:

$$\cos \alpha^* = \frac{K_1}{\sqrt{K_1^2 + \left(K_2 - n\frac{T''}{v''}\right)^2 + K_3^2}} \tag{51}$$

$$\cos \beta^* = \frac{K_2 - n\frac{T''}{v''}}{\sqrt{K_1^2 + \left(K_2 - n\frac{T''}{v''}\right)^2 + K_3^2}} \tag{52}$$

$$\cos \gamma^* = \frac{K_3}{\sqrt{K_1^2 + \left(K_2 - n\frac{T''}{v''}\right)^2 + K_3^2}} \tag{53}$$

By turning the objective plane out of the original position into the new position described, the image points optically image inverted to the object points A, B, and C shift, whereby they come to lie in the image plane P*, by which the desired camera setting according to Scheimpflug is obtained.

As has been pointed out, it is also possible to use other coordination systems, in which cases, however, the equations given above are only valid after a corresponding coordinate transformation.

Figure 6:
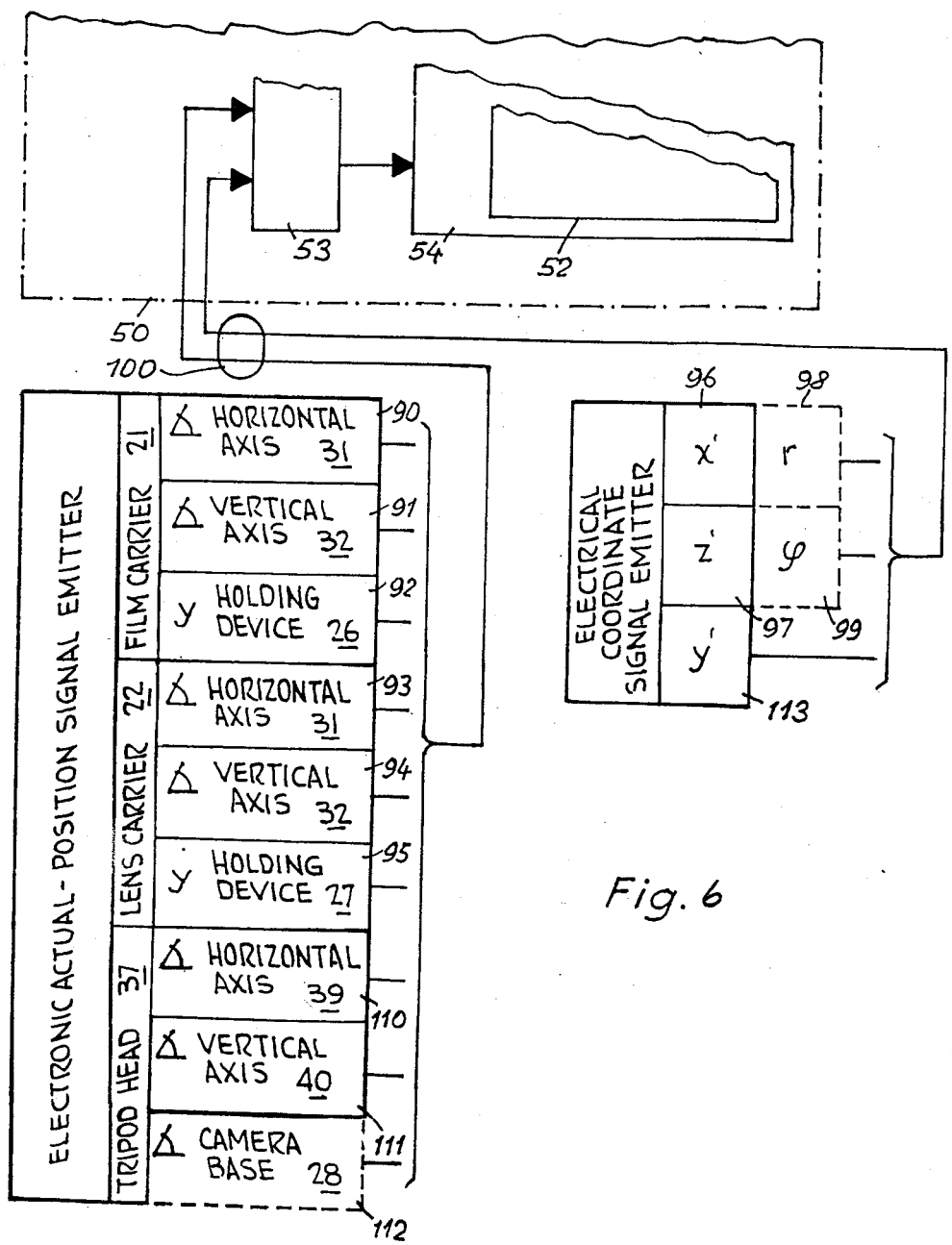

In a camera 20 equipped according to the invention, the film carrier 21 and the lens carrier 22 are both attached in a known manner by means of a multi-part holding device 26 or 27 (FIG. 2) to a camera base, which is arranged as an optical bench. Each of the holding devices 26 and 27 can be reset in the longitudinal direction of the camera base, and has hinges with axes 31 and 32 which extend at right angles to each other, about which the related image carrier or lens carrier can be inclined or pivoted. According to the usual terminology in photographic technology, axis 31 is known as the "horizontal" axis and axis 32 as the "vertical" axis, even though these axes 31 and 32 can in practice extend in different directions than horizontally and vertically, respectively. Each of the hinges of the axes 31 and 32 has an angle-measurement scale (not shown), respectively, for indicating the angle of the inclination and/or pivoting of the film carrier 21 and/or the lens carrier 22. In addition, the camera base has a longitudinal measurement scale (not shown), for indicating the relevant distance of the image plane P from the lens plane O. For the sake of simplicity, it is assumed that at the basic, or zero, setting of the hinges, the camera base extends parallel to the optical axis Q of the camera lens 23. The camera base is attached to a holder (not shown), which is supported via a tripod head 37 (FIG. 6) on a tripod. In known manner, the tripod head 37, which includes various parts, permits an inclination and a pivoting of the holder about a horizontal axis 39 and/or a vertical axis 40 (FIG. 6). For this purpose, the hinges 39 and 40 are each provided with an angle-measurement scale (not shown).

Two setting adjusters (not shown) are moveably mounted on the film carrier 21 of the camera 20, and are respectively provided with pointers (not shown) which reach straight across the focusing screen 25. One such pointer extends parallel to the vertical pivot axis 32, while the other pointer extends at right angles thereto. The aforementioned setting adjusters respectively have associated longitudinal-measurement scales (not shown) provided by the face of film carrier 21, for indicating the location of the relevant pointer, respectively, and to ascertain the plane coordinates of an image point situated at the intersection of the pointers. The distance of the image plane P from the lens plane O at sharp reproduction on the focusing screen 25 is used for additional coordinates for the definition of the spatial position of the image point. In a spatial coordination system, the y-axis then coincides with the optical axis Q of the lens 23, while the x and z axes for this purpose lie in the lens plane O, parallel to the pointers, extending through the main point H. In such a coordinate system, the spatial coordinates of the image points A', B', and C', which are individually sharply set on the focusing screen, can be relatively easily ascertained, as can be seen from the equations (3), (4) and (5).

The calculations which serve to set the camera according to Scheimpflug are carried out by means of an electronic calculator 50 (FIG. 2) which includes a keyboard for the entry of data, and a visual display (FIGS. 4 to 6) for indicating results and instructing the photographer. In the technologically simplest case, it is provided that the focal distance f of the lens 23, and the spatial coordinates x', y', and z', or y', r, and $\phi$, of the various image points A', B', and C', are transmitted manually in sequence to the calculator 50 by means of its keys. According to the schematic representation of FIG. 2, the calculator 50 also includes an arithmetic unit 53 with signal input points and signal output points, as well as a signal evaluation device 54, which is attached to the signal output points of the arithmetic unit 53, and includes the visual display 52. The keys, which serve for data input, are connected with means for generating electrical signals 55 through 59 corresponding to the entered data. The signals thus generated are entered into the signal input points of the arithmetic unit 53 and are stored in the latter.

Figure 2:
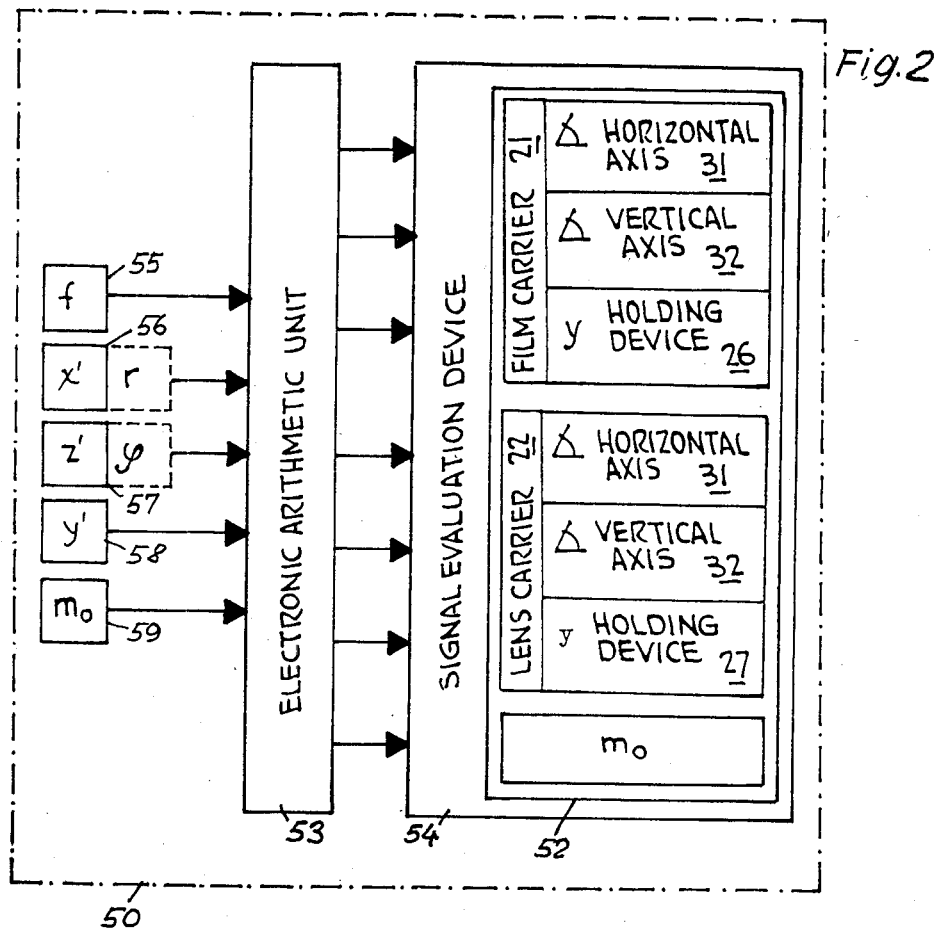
FIG. 2 is a schematic representation of a calculator for the ascertainment and indication of data for the correct camera setting according to Scheimpflug's law.

The arithmetic unit 53 contains an arithmetic program according to which electrical output signals are generated based on the entered signals and Scheimpflug's Law, and are transmitted to the signal evaluation devices 54. The photographer can then see on the visual display 52 in which direction and by which amount the film carrier 21 and/or the lens carrier 22 of the camera 20 should be inclined, pivoted or moved along the camera base, in order to obtain a correct setting of the camera according to Scheimpflug. The arithmetic unit 53 is also programmed such that, after activation of a designated key on the keyboard, it calculates the relevant resulting mean reproduction scale $m_o$, and indicates such scale in the visual display. In addition, the programming of the arithmetic unit 53 is such that a desired mean reproduction scale $m_o$ can be input by means of the keyboard, and thereafter the arithmetic unit 53 calculates an ideal setting of the image carrier 21 and the lens carrier 22 of the camera 20, which is correct according to Scheimpflug, based on the entered value for $m_o$ and on the previously calculated spatial coordinates of the object points, and indicates them on the visual display 52. These procedures are schematically represented in FIG. 2.

A variation of the camera assembly described above is made possible according to FIG. 4. In lieu of the setting adjusters, and the pointers a rod-shaped index element (not shown) is provided for this embodiment on the film carrier 21 of the camera 20, such element including a sighting opening at one of its ends. The index element is longitudinally movable, and is mounted on a small turntable (not shown), which is rotatably mounted on the film carrier 21. By longitudinal movement and pivoting of the index element, the sighting opening can be set to any desired point of the focusing screen 25 of the camera 20, whereby an outwardly extending end portion of the index element serves as a handle for the manipulation of the index element. Employed as plane coordinates of the relevant set points in the plane of the focusing screen 25 are, for this purpose, the distance r of the central point of the sighting opening from the center of the turntable, and the angle $\phi$ between the longitudinal axis of the index element and a line which preferably extends parallel to the pivot axis 32 of the film carrier 21 or, under certain circumstances, is parallel to the inclination axis 31, depending upon which of these axes 31 and 32 has an unchangeable position in relation to the film carrier 21. It is manifest that, from the values ascertained for r and $\phi$, the x and z coordinates of the observed point of the focusing screen 25 can be calculated without difficulty. According to the setup in FIG. 2, the values for r and $\phi$ simply have to be entered into the arithmetic unit by means of the keyboard, in place of the x and z coordinates, as indicated in FIG. 2 in dashed outline.

In a further development of the aforementioned embodiment, optical-electronic detector elements are available for the sighting opening of the rod-shaped index element, with the aid of which the optimal image sharpness of the observed point can be determined on the focusing screen. Such detector elements are known, for instance, for cameras with automatic sharpness settings. For this purpose, the detector elements are movably mounted in a hollow space of the index element so that they can be moved into the sighting opening for measurement after the relevant image point has been observed. For the electrical connection of the detector elements with the arithmetic unit 53, a flexible cable (not shown) is provided between the calculator 50 and the end portion of the index element employed as a handle for manipulation of the index element. The detector elements facilitate the exact ascertainment of the y coordinates of each of the observed image points.

As a further development thereof embodiment, the index element can be provided at the sighting opening with electro-optical or electro-acoustical Echolotapparatus with the aid of which the relevant distance of the observed image point from the lens carrier 22 is measurable, in order to ascertain the y coordinate of the observed image point. For such purpose, a small electro-acoustical ultrasonic transducer can be movably mounted in the interior of the hollow index element, like the above-mentioned detector elements, so that it can be moved for measurement in the sighting opening. The electronic switching system for echo measurement belonging to the ultrasonic transducer can, for this purpose, be provided in the calculator 50.

FIG. 3 represents a purpose-oriented supplement to the construction of the calculator 50 shown in FIG. 2. Accordingly, additional means 70 are provided for the generation of electrical signals which can be entered into the arithmetic unit 53 and stored therein, and which correspond to the limits of the resettabilities of the film carrier 21 and the lens carrier 22, as well as the limits of the mechanical and/or optical resettability of the bellows 24. The limits of resettability of the film and lens carriers are given by the length of the camera base, by the limits of inclinability and pivotability about the axes 31 and 32, as well as the limited flexibility of the bellows 24. The arithmetic unit 53 is now programmed so that it compares the signal for the calculated ideal setting of the film carrier 21 and/or the lens carrier 22 with the stored limit-value signals, and in each case when a calculated ideal setting would lead to exceeding the above-mentioned limits of resettability, it transmits an electrical warning signal to the signal evaluation device 54. The electrical warning signal activates an optical alarm signal in the visual display, as shown in FIG. 3. Simultaneously and advantageously, an acoustical signal emitter is activated to warn the photographer. Means controlled by the electrical warning signal for the automatic blocking of the reset mechanisms of the camera may also be provided.

According to FIG. 3, additional means 71, 72 and 73 are provided for the generation of electrical signals corresponding to the image angle of the lens 23, the dimensions of the image aperture on the film carrier 21, and the position of the image aperture in the image plane P. These data, which can be manually entered into the calculator 50 by means of the keyboard, or automatically with pre-defined coding means, also are significant in connection with the resettability of the camera, since, if these data are ignored, an undesired vignetting of the photograph can occur. The arithmetic unit 53 is now programmed so that it compares the ideal setting signals for a camera setting according to Scheimpflug for an ideal setting of the film carrier 21 and/or the lens carrier 22 with signals emitted by the signal generators 71, 72 and 73, and in each case when an ideal setting corresponding to the ideal-position signals would lead to exceeding the area given by the image angle of the lens and the dimensions of position of the image aperture, it transmits an electrical warning signal to the signal evaluation device 54. The electrical warning signal activates an optical alarm signal in the visual display, as shown in FIG. 3, whereby, advantageously, an acoustical signal emitter is simultaneously activated to warn the photographer. In this case as well, means controlled by the electrical warning signal for the automatic blocking of the reset mechanisms of the camera may be provided.

Figure 4:
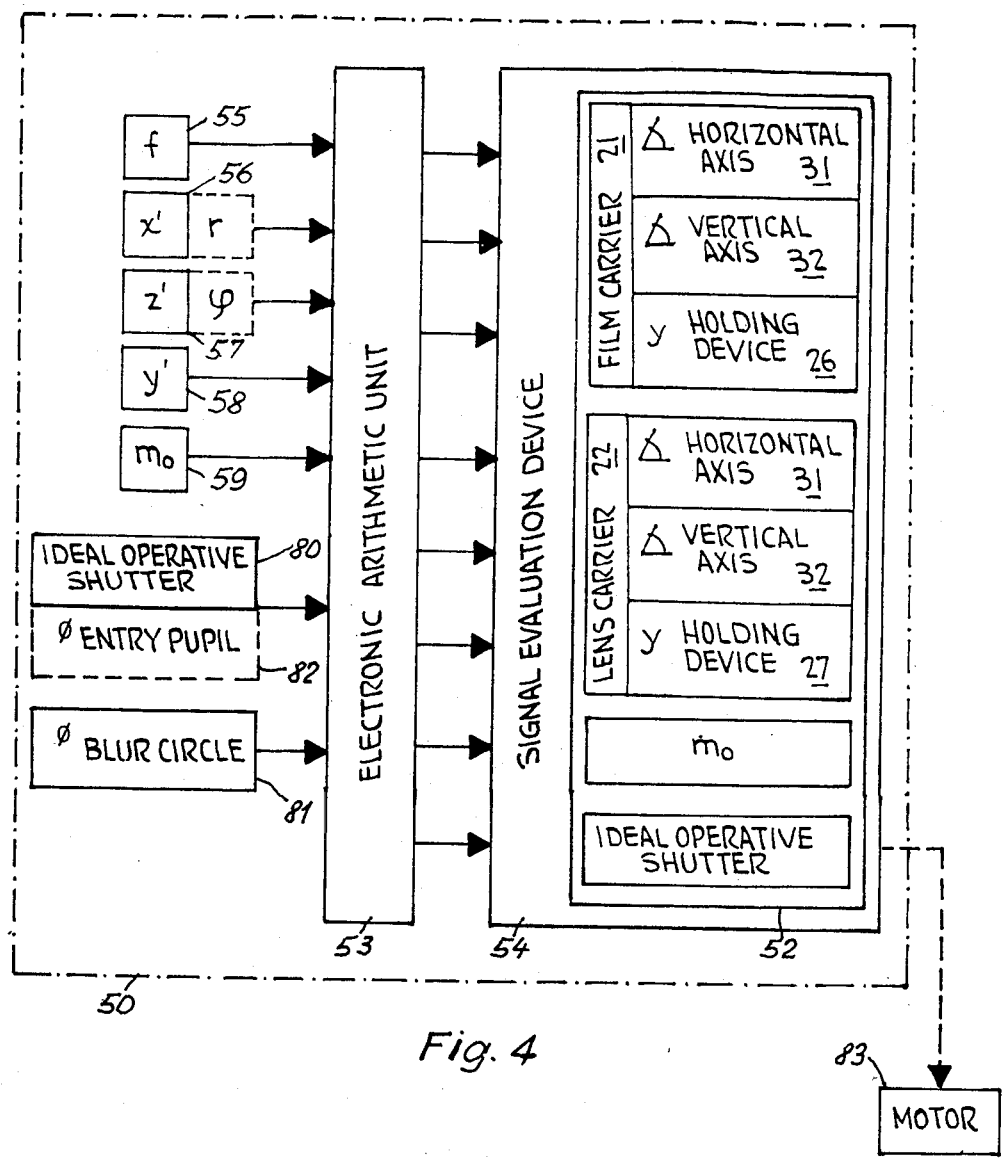
FIGS. 4 through 6 are schematic representations of various further designs of the apparatus according to the invention.

The embodiment of the invention shown schematically in FIG. 4 represents a further development of the FIG. 2 embodiment. In addition to the part already shown in FIG. 2, the calculator according to FIG. 4 includes means 80 and 81 for generating electrical signals corresponding to the actual value of the relative opening of the operational shutter of the lens 23, and/or corresponding to the diameter of the blur circle permissible in the image plane. These data can, for example, be entered into the calculator 50 by means of the keyboard, but they can just as well, under certain circumstances, be entered automatically by pre-defined coding means. The arithmetic unit is programmed so that, based on the signals transmitted by the signal generators 80 and 81 and the signals transmitted by the signal generator 55 corresponding to the focal distance f of the lens 23, it calculates the image-side depth of focus and generates and stores a signal corresponding thereto. In addition, the signals corresponding to the spatial coordinates of more than three image points, which need not all lie in a common plane, i.e., whose optically image inverted object points may in part lie outside the scene plane G, can be stored in the arithmetic unit. Finally, the arithmetic unit is programmable so that, on the basis of the signals corresponding to the depth of focus and the stored spatial coordinate signals, it generates the ideal-position signals for an ideal setting of the camera such that the image points lie inside or as little as possible outside the image-side depth of focus. Thus, under certain circumstances, a camera setting can result in which the image plane P does not exactly contain all three, in certain cases even not a single one, of the image points image inverted for the object points, which setting nonetheless permits a generally optimal reproduction with tolerable non-sharpness.

In lieu of or in addition to the means 80 for the generation of a signal corresponding to the actual value of the relative opening of the operational shutter, means 82 can be provided for the generation of a signal corresponding to the size of the entry pupil of the lens 23, as indicated in FIG. 4 in dashed outline. The image-side depth of focus can also be calculated from the size of the entry pupil and the size of the permissible blur circle in the image plane.

In addition, the arithmetic unit 53 is advantageously programmed so that it generates an output signal which is an ideal-shutter signal corresponding to an ideal value of the relative opening of the operational shutter of the lens, i.e., an ideal value which yields the smallest possible, but sufficient, focal length for the reproduction of several object points, not all of which lie in a common plane, with tolaerable non-sharpness. The ideal shutter signal is transmitted to the signal evaluation device 54, in the visual display 52 of which the relative opening of the operative shutter which is to be set is indicated. In a further expanded version, the ideal-shutter signal can also serve to direct a drive motor 83 which automatically sets the relative opening of the operative shutter of the lens corresponding to the ideal-shutter signal.

Figure 5:
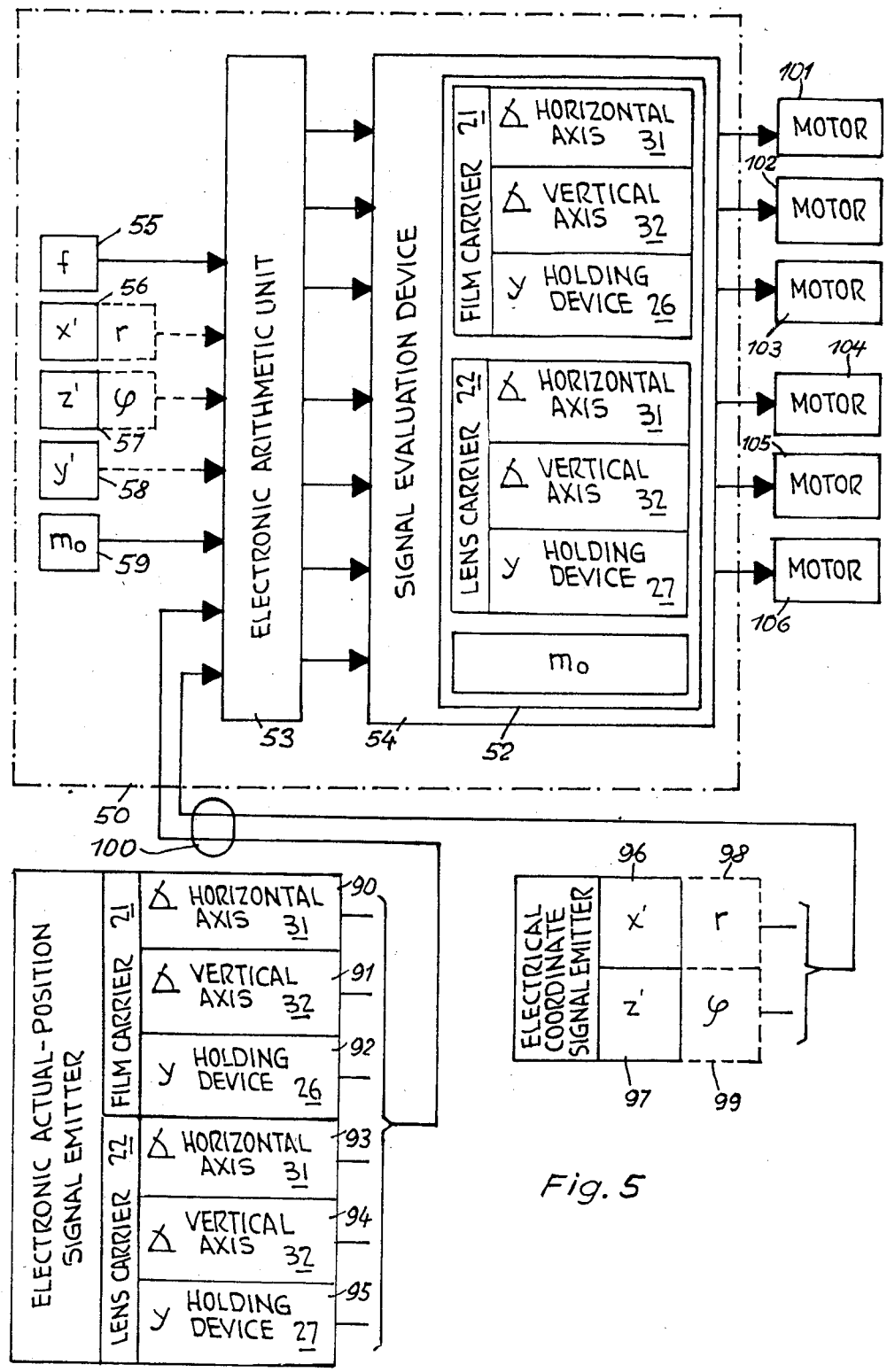

In a still further developed embodiment of the invention, illustrated schematically in FIG. 5, the holding devices 26 and 27 for the film carrier 21 and/or the lens carrier 22 are each provided with three electrical signal emitters 90, 91, 92 and 93, 94, 95, respectively, which generate electrical actual-position signals corresponding to the relevant inclination or pivot angles about the horizontal axis 31 and the vertical axis 32, and corresponding to the relevant situation of the holding device 26 or 27 along the camera base. In addition, each of the setting adjusters and is provided with an electrical signal emitter 96 and/or 97, which generates an electrical signal dependent on the current position of the pointer, so that this signal corresponds to the coordinates x' or z' of the point of intersection of the pointers. In the FIG. 5 embodiment, two other signal emitters 98 and 99 may be provided in lieu of the signal emitters 96 and 97 for the generation of electrical signals corresponding to the distance r and/or the angle $\phi$. All the signal emitters 90 through 99 are connected by means of a multi-conductor cable 100 (FIGS. 5 and 6) with signal entry points of the electronic arithmetic unit 53. The latter is preferably so programmed that it automatically and in relatively rapid cyclical sequence receives the signals transmitted by the signal emitters 90 through 99, and incorporates them into the calculation of the ideal positions of the film carrier 21 and the lens carrier 22.

The calculator 50 is otherwise constructed largely identically to the FIG. 2 embodiment, with the exception that the signal emitters 56, 57, and 58, which are activated by means of the keyboard, and which generate the coordinate signals for the image points, can be omitted because they are dispensible in the FIG. 5 embodiment.

In addition, FIG. 5 includes six electric drive motors 101 through 106, of which three each are respectively associated with the holding device 26 for the image carrier 21 and the holding device 27 for the lens carrier 22. These motors serve to drive the hinges with the horizontal axes 31 and the vertical axes 32, and also to drive the holding devices 26 and 27 along the camera base. The motors 101 through 106 are connected with the control signal output points of the signal evaluation device 54, and serve to automatically introduce the ideal positions of the film carrier 21 and/or the lens carrier 22, which are indicated in the visual display.

The FIG. 5 embodiment of the invention permits a simplified and secure determination of the spatial coordinates of the image points optically image inverted for the significant object points, since a manual transmission of scale values to the calculator is dispensed with. In addition, in the apparatus according to FIG. 5, all temporary positions and settings of the film carrier 21 and/or the lens carrier 22 are passed on to the arithmetic unit 53 by means of the actual-position signal emitters 90 through 95, which unit continually incorporates these positions or resettings into the calculations. Finally, the electric drive motors 101 through 106 ensure that the ideal positions calculated in each case for the satisfaction of Scheimpflug's law will be automatically maintained. Thus it is possible, for example, after an initial camera setting according to Scheimpflug has been obtained, as is, for instance, shown in FIG. 1, to change the position of the film carrier 21 in order to obtain a different perspective of the reproduction of the motif scene to be photographed, in which case a different setting will completely automatically be given to the lens carrier 22 as well, so that Scheimpflug's Law will continue to be satisfied. Conversely, the photographer can voluntarily change the setting of the film carrier in order to achieve a different image scale, in which case, too, the film carrier 21 will receive a different setting automatically, so that Scheimpflug's Law will again be satisfied. For this purpose, the arithmetic unit 53 is also programmed so that, on the basis of a manual entry of a different image scale $m_o$ (by means of the keyboard and the signal emitter 59) the lens carrier 22 and the film carrier 21 are automatically reset via the motors 101 through 106 such that the desired new image scale results, and Scheimpflug's Law continues to be satisfied.

The version according to FIG. 5 can advantageously also be supplemented by the equipment described with reference to FIGS. 3 and 4.

A variation of the design according to FIG. 5 is also possible, however, according to which the drive motors 101 through 106 are dispensed with. The photographer thus need not set the ideal settings shown in the visual display manually, but has the advantage that all settings and resettings of the film carrier and/or the lens carrier are automatically transmitted to the arithmetic unit 53, and continually incorporated into the calculation.

In addition to the optical indications in the visual display 52 or, under certain circumstances, in lieu thereof, acoustical indication devices can be provided which, for example, include electronic speech simulators.

For this purpose, FIG. 6 illustrates an advantageous supplement of the version of the invention illustrated in FIG. 5. In addition to the electrical actual-position signal emitters 90 through 95, which are mounted on the holding devices 26 and 27 of the film carrier 21 and the lens carrier 22, respectively, as well as to the hinge axes 31 and 32 (FIG. 5) the version according to FIG. 6 includes the additional actual-position signal emitters 110 and 111 which are mounted on the tripod head 37, and generate electrical signals corresponding to the relevant inclination or pivot angle about the horizontal axis 39 or the vertical axis 40. These electric signals are transmitted to the electronic arithmetic unit 53 by means of the cable 100. The latter is programmed such that it also incorporates the signals transmitted by the actual position signal emitters 110 and 111 into the calculation of the ideal setting of the film and/or lens carrier of the camera. This permits the photographer to change the direction of the camera base without thereafter having to ascertain again the spatial coordinates of the significant object points. Such a modification of the direction of the camera base can, for instance, be indicated or necessary if the resetability of the film and lens carriers alone is insufficient to introduce a correct camera setting according to Scheimpflug.

If the camera base is rotatable in the holder and the tripod head 37, and can be fixed in any desired position of its rotation, it can be advantageous to provide an additional actual-position signal emitter 112, as indicated in FIG. 6 in dashed outline, so that this actual-position signal emitter 112 generates electrical signals corresponding to the current rotation position of the camera base. These actual-position signals are then transmitted through the cable 100 to the electronic arithmetic unit 53. The latter is in this case programmed such that it incorporates the signals transmitted by the actual-position signal emitter 112 into the calculations as well. This permits the photographer to change the image aperture by modifying the rotational position of the camera base without thereafter having to ascertain again the spatial coordinates of the significant object points.

In FIG. 6, finally, an additional electrical signal emitter 113 is also provided for the automatic entry of the y' coordinate signal. This signal emitter 113 operates, for example, under the control of electro-optical or electro-acoustical Echolot-apparatus, as such have been mentioned above, and which serve to transmit the current distance of the sighting opening 61 of the rod-shaped index element 60 from the lens carrier 22.

It is manifest that the version according to FIG. 6 can also be supplemented by the equipment described with reference to FIGS. 3 and 4.

While according to FIGS. 4 to 6, the calculator 50 is a device connected to the camera 20 by means of an electrical cable 100, versions of the invention are of course possible in which the calculator is directly attached to a part of the camera, or is integrated into a part of the camera, without departing from the invention.

What is claimed is:

1. An apparatus for a photographic camera having a lens carrier and a film carrier which are relatively adjustable to each other for the computational transmission of data regarding the lens and film carriers in regard to a facilitated attainment of optimal camera settings in relation to a motif scene to be photographed, the apparatus comprising means for generating spatial coordinate signals which define spatial positions of image points which have been optically image inverted for points of measurement of a motif scene, the spatial coordination signals capable of being entered into signal input points of an electronic calculator, and capable of being retained in the calculator, signal evaluation devices at the signal output points of the calculator, the calculator having a calculation program according to which the calculator generates electrical output signals based on the input spatial coordinate signals and Scheimpflug's Law, and passes them to the signal evaluation devices, which output signals comprise ideal-position signals corresponding to an ideal setting of one of the film carrier and the lens carrier for minimal unsharpness of the reproduction of the points of measurement, and comprise change-of-position signals corresponding to the resetting of one of the film carrier and the lens carrier required for the introduction of ideal settings.

2. The apparatus according to claim 1, wherein means are provided for generating additional signals which correspond to the size of a blur circle permissable in the image plane and one of the size of the entrance pupil of the camera lens and the focal distance and the relative opening of the operative shutter of the lens, said additional signals capable of being entered into the signal input points of the calculator, and the calculator being programmed such that, based upon said additional signals, the calculator calculates the image-side depth of focus and generates and stores an electrical signal corresponding thereto, the spatial coordinate signals for the definition of the spatial positions of more than three image points which have been image inverted for points of measurement of the motif scene capable of being entered into the calculator and stored therein, and the calculator being programmed for generating an ideal-position signal and a position-modification signal for such an ideal setting of one of the film carrier and the lens carrier, according to which the image points image inverted for the points of measurement of the motif scene are substantially within an image-side depth of focus.

3. The apparatus according to claim 2, wherein the calculator is further programmed for generating an output signal which is an ideal-shutter signal corresponding to an ideal value of the relative opening of the operative shutter of the lens, which yields one of a minimum-possible sufficient depth of focus, and a shutter modification signal corresponding to the necessary resetting of the shutter for the introduction of the relative opening of the operative shutter corresponding to the ideal-shutter signal.

4. The apparatus according to claim 1, wherein means are provided for generating additional electrical signals which correspond to the focal distance of the camera lens and a desired mean representation standard, said additional electrical signals capable of being entered into the signal input points of the calculator, and the calculator being programmed for generating the output signals for the ideal setting of one of the film carrier and the lens carrier, by incorporating said additional signals.

5. The apparatus according to claim 1, wherein the signal evaluation devices include signal emitters for indicating ideal settings of one of the film carrier and the lens carrier corresponding to the ideal-position signals.

6. The apparatus according to claim 2, wherein the signal evaluation devices include emitters for indicating any necessary resetting of one of the film carrier and lens carrier corresponding to the position modification signal, for the purpose of introducing the ideal setting of one of the film carrier and lens carrier.

7. The apparatus according to claim 3, wherein the signal evaluation device include signal emitters for indicating the ideal-shutter signal corresponding to the relative opening of the operational shutter of the camera lens.

8. The apparatus according to claim 7, wherein the signal evaluation devices include signal emitters for indicating the necessary resetting of the relative opening of the operational shutter of the camera lens corresponding to the shutter modification signal, for the purpose of introducing the relative opening of the operational shutter corresponding to the ideal-shutter signal.

9. The apparatus according to claim 1, wherein means are provided on the film carrier of the photographic camera for ascertaining plane coordinates of the image points within the image plane which have been image inverted for points of measurement of the motif scene, means provided to ascertain one of additional coordinates of each of said image points corresponding to the distance between the lens carrier and the film carrier of the photographic camera, and the coordinates ascertained in each case capable of being transmitted to the means for generating electrical spatial coordinate signals.

10. The apparatus according to claim 9, wherein the means for ascertaining the plane coordinates include at least one index element which is movable within the image plane and which can be set to any desired point in the image plane, in order to establish the position in the image plane of image points which have been image inverted for a point of measurement in the motif scene.

11. The apparatus according to claim 10, wherein signal emitters are connected to the index element and the film carrier for generating electrical plane coordinate signals which define the plane coordinates of the point to which the index element is set at any time, and the plane coordinate signals are capable of being entered into the calculator as a part of the spatial coordinate signals.

12. The apparatus according to claim 9, wherein a reset mechanism for modifying and setting the distance between the lens carrier and the film carrier of the photographic camera is provided with an electrical signal emitter for generating an electrical signal corresponding to the appropriate distance, which is capable of being entered into the calculator as part of the spatial coordinate signals.

13. The apparatus according to claim 1, wherein at least one optical-electrical element is provided on the film carrier of the photographic camera which generates an electrical signal each time the optimal resolution of the image of a point of measurement of the motif scene is available, for transmitting it to the calculator.

14. The apparatus according to claim 9, wherein the means for ascertaining additional coordinates of an image point for a point of measurement of the motif scene include Echolot-apparatus of one of an electro-optical and electro-acoustical type.

15. The apparatus according to claim 1, wherein reset mechanisms for resetting the film carrier and the lens carrier in relation to one another are each provided with an electrical signal emitter for generating electrical actual-position signals which can be entered into the signal input points of the calculator.

16. The apparatus according to claim 15, wherein each of the reset mechanisms of at least one of the lens and film carriers is provided with a drive motor, and the signal evaluation devices include control means for controlling the drive motors, such that the ideal settings of the film carrier and the lens carrier corresponding to the ideal-position signals, or the resettings of the film carrier or the lens carrier corresponding to the position modification signals can be automatically introduced.

17. The apparatus according to claim 2, wherein the shutter of the camera lens is provided with an electrical signal emitter for the generation of actual-shutter signals corresponding to the relative opening of the operative shutter at any time, which is capable of being entered into the signal input points of the calculator.

18. The apparatus according to claim 17, wherein the shutter of the camera lens is provided with a drive motor, and the signal evaluation devices include control means for controlling said drive motor, such that the ideal setting of the shutter corresponding to one of the ideal-shutter signal and the resetting of the shutter corresponding to the shutter modification signal can be automatically introduced.

19. The apparatus according to claim 1, wherein means are provided for generating additional electrical signals which correspond to the limits of each of mechanical reset mechanisms for resetting the lens and film carriers in relation to one another, and correspond to the limits of resettability of a connecting body located between the film carrier and the lens carrier for screening out extraneous light, said additional signals being enterable into the signal input points of the calculator and being storable in the calculator, and the calculator being programmed for comparing one of the ideal position signals and the position modification signals with the additional signals corresponding to the limits of resettability, and in each case transmitting an electrical warning signal to the signal evaluation devices if an ideal setting corresponding to one of the ideal-position signals and a resetting corresponding to the position modification signals would lead to exceeding the limits of resettability of one of the reset mechanisms and of the connecting body, and that the signal evaluation devices include means controllable by the warning signal for blocking the reset mechanism concerned and the signal emitter controllable by the warning signal, for warning the photographer.

20. The apparatus according to claim 1, wherein means are provided for generating additional electrical signals which correspond to the image angle of the camera lens, the dimensions of the image aperture of the camera and the situation of the image aperture in the image plane, said additional signals capable of being entered into the signal input points of the calculator and capable of being stored in the calculator, and the calculator being programmable for comparing one of the ideal-position signals and the position modification signals with said additional signals and for transmitting an electrical warning signal to the signal evaluation devices if an ideal setting corresponding to one of the ideal-position signals and a resetting corresponding to the position modification signals would lead to exceeding the area given by the image angle of the lens and the dimensions and the situation of the image aperture, and the signal evaluation devices include means controllable by the warning signal for blocking the reset mechanism concerned, and signal emitters controllable by the warning signal for warning the photographer.

21. The apparatus according to claim 1, wherein the signal evaluation devices include devices controllable by output signals for informing the photographer as to the actions to be taken by the photographer in order to introduce the ideal setting of the film carrier and the lens carrier and the operative shutter of the lens.

22. The apparatus according to claim 5, wherein the calculator is programmed such that, after the sharpness setting of the image of a measurement point of the motif scene and after the generation of spatial coordinate signals for the definition of the spatial situation of this image point, for subsequent sharpness settings of the image of an additional measuring point of the motif scene, the electrical output signals direct the signal evaluation devices so that the signal emitters indicate which additional settings of at least one of the lens and film carriers are necessary in order to maintain the previous sharpness setting.

23. The apparatus according to claim 5, wherein the calculator is programmed for cyclically checking whether Scheimpflug's Law continues to be satisfied after the introduction of the ideal setting of one of the film carrier and the lens carrier, and when any modifications of the setting of one of the lens and film carriers appear, the electrical output signals direct the signals evaluation devices such that the signal emitter indicates which additional resettings of at least the other of the lens and film carriers are necessary in order that Scheimpflug's Law will again be satisfied.

24. The apparatus according to claim 16, wherein the calculator is programmed such that after the sharpness of the image of a point of measurement of the motif scene, and after the generation of the spatial coordinate signals for the definition of said image point, for subsequent sharpness settings of the image of an additional point of measurement of the motif scene, the electrical output signals automatically direct the drive motor of the reset mechanisms of at least one of the lens and film carriers by means of the signal evaluation devices, such that the preceding sharpness setting is maintained.

25. The apparatus according to claim 16, wherein the calculator is programmed for cyclically checking whether Scheimpflug's Law continues to be satisfied after the introduction of the ideal setting of one of the film carrier and the lens carrier, and that, when any modifications of the setting of one of the lens and film carriers appear, the electrical output signals direct the drive motor of the reset mechanism of at least the other of the lens and film carriers such that Scheimpflug's Law will again be satisfied.

26. The apparatus according to claim 5, wherein electrical command signals are capable of being entered into the signal entry points of the calculator, and the calculator is programmed so that, due to said command signals, the electrical output signals, by means of the signal evaluation devices, automatically direct the drive motors of the reset mechanisms of the lens carrier and the film carrier so that, in conformity with Scheimpflug's Law, the means image scale becomes larger or smaller.

* * * * *